Jan. 15, 1924.
H. A. DENMIRE
METHOD AND APPARATUS FOR SORTING WASHERS
Filed Jan. 27, 1922
1,480,898
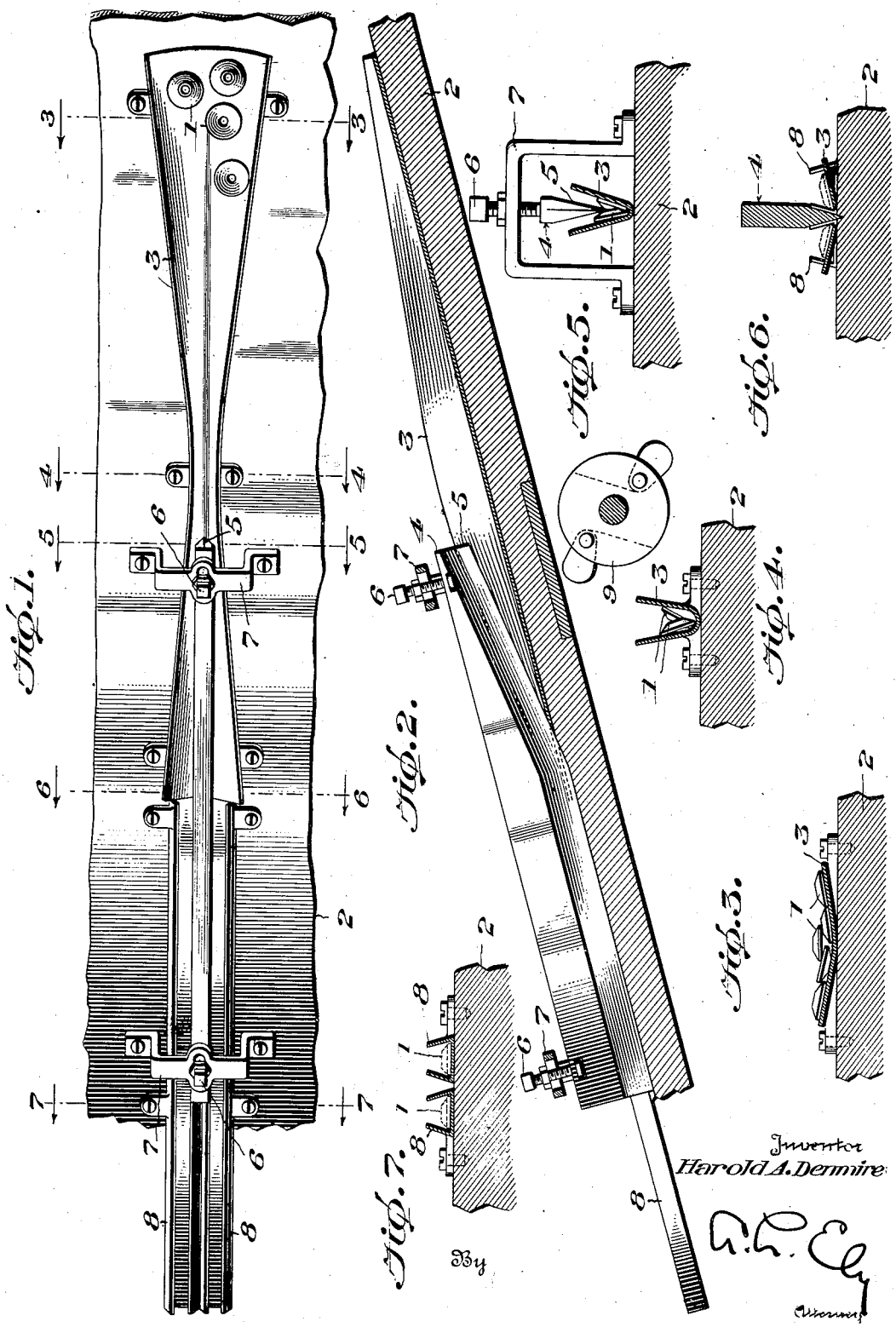
Inventor
Harold A. Denmire Patented Jan. 15, 1924.

1,480,898

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

METHOD AND APPARATUS FOR SORTING WASHERS.

Application filed January 27, 1922. Serial No. 532,246.

*To all whom it may concern:*

Be it known that I, HAROLD A. DENMIRE, a citizen of the United States, residing at Akron, in the county of Summit, State of Ohio, have invented certain new and useful Improvements in Methods and Apparatus for Sorting Washers, of which the following is a specification.

This invention relates to the art of manufacturing rubber heels or similar articles, which are usually constructed with a number of small metallic washers or burrs, through which the securing nails are driven for affording an anchorage for the heads of the nails. In the manufacture of rubber heels, for example, there are provided in the mold a series of shouldered pins on which the washers are placed, the extremities of the pins passing through holes in the washers, and the placing of the washers in the mold by hand or by machine has presented certain difficulties to be referred to.

One of the difficulties which is encountered in the placing of the washers is due to the fact that certain manufacturers prefer to use coned or dished washers, the concave side of which lead into the nail holes, these washers being placed with the concave side faced toward the entering point of the securing nail, so that the point of the nail is guided into the hole. This necessitates the placing of the washers in one direction in the mold and it is the purpose of this invention to sort the washers so that they will all be turned in the same direction prior to their placement in the mold by hand or by machine.

For the purpose outlined I have devised a method and apparatus which will quickly and easily handle a large number of washers and turn them all in one direction.

In this application I have disclosed an extremely simple and effective device and method for handling the washers so that they are sorted and delivered turned in the same direction, for this purpose making use of an entirely new principle in the handling of these articles. The method and apparatus which I have devised are superior to other methods as it requires no attention or superintendence whatever, the washers sorting themselves automatically and by gravity.

This invention relates both to process and apparatus. While I have shown one form of apparatus for carrying out the process, it will be understood that, having explained the principles of the invention, other forms and variations of the apparatus may be devised which will contain the broad principles of the invention.

In the drawings:

Fig. 1 is a plan view of a simple form of device for carrying out the purposes of the invention.

Fig. 2 is a longitudinal vertical section thereof.

Figs. 3, 4, 5, 6 and 7 are cross sections, respectively, on the lines 3—3; 4—4; 5—5; 6—6; and 7—7 of Fig. 1, showing the several stages or positions which the washers occupy in passing through the device.

Briefly stated the method of my invention comprises a new departure in the handling of these coned metal washers or burrs, in that the washers are caused to assume a vertical plane at which time, in a group of washers, they will be found with the cones pointing in both directions. When the washers have been placed in this position they may be divided or caused to fall apart in two directions, determined by the direction of the taper. Having conceived this step of the process, that is the standing of the washers on edge, various means may be provided for utilizing the differences in position of the washers for separating them.

The washers are designated by the numerals 1, being shown in plan view in Fig. 1 and in side elevation in Figs. 3 to 7 inclusive.

An apparatus such as may be used for this purpose comprises a tilted plate or table 2 which is inclined at the proper angle to cause the washers to slide and roll by gravity through the device. On the face of the table is secured a metal chute or horn 3. The upper end of the chute is substantially flat as shown in Fig. 3 and receives the washers from any suitable supply turned in both directions indiscriminately. The sides of the chute are gradually brought up to form walls as shown in Fig. 4, and as the washers pass from the flaring entrance to the narrow pass, in the chute, they are turned on edge and start to roll down the chute in single file, the accelerated travel of the washers compensating for the more restricted passageway.

From an inspection of Fig. 4 it will be seen that the washers are faced so that the cones point both to the right and to the left, and this positioning of the washers is availed of in sorting them. A practical and simple means of accomplishing this will now be described.

As the washers roll down the narrow passageway in single file as shown in Fig. 4, they meet a separator such as a thin bladed knife 4, the sharp edge 5 of which tapers upwardly and is placed within the narrow portion of the chute so that it enters between the washers and divides them as shown in Fig. 5, those which are pointed to the left passing on the right side of the knife and those which are pointed to the right passing to the left of the knife.

The knife 4 may be supported by screw-threaded pins 6 which engage in slots in brackets 7 secured to the plate 2. By the adjustable mounting it is possible to locate the knife accurately to accommodate different sizes and conditions of washers.

As the washers pass the blade of the knife, they are gradually laid back by the tapering of the knife blade and by the gradual turning or flattening of the walls of the chute until they lie in two parallel columns both with the washers therein, pointing upwardly.

From the lower end of the chute the two columns of washers pass into parallel runways 8, which conduct them to any suitable assembling device from which they may be placed in the heel molds by hand or by machinery as desired.

Any suitable form of vibrating or agitating device may be employed to vibrate the chute and assist in the passage of the washers, a conventional form being shown at 9 in Fig. 2 comprising a plurality of revolving beaters 10 which lightly tap the table on which the chute is supported and prevent the washers jamming in the chute or passages 8.

While the apparatus and method have been described with considerable detail and accuracy, so as to enable one skilled in the art to practice the invention, it will be appreciated that numerous modifications and alterations may be made without departing from the principles of the invention as fully set forth and embodied in the claims attached hereto.

Claims:

1. A process for handling cone shaped washers so that they will all lie in the same direction, comprising standing the washers on edge and then dividing them into two groups according to the direction in which they face, and then turning the washers of the two groups so that they all face in the same direction.

2. A process for arranging a plurality of washers, comprising turning all of said washers so that they will roll on their edges, and then dividing them, as they are rolling, into two orderly groups in accordance with the direction in which they are faced.

3. A process for sorting a plurality of washers which are indiscriminately arranged, comprising turning all of said washers in a vertical plane, and then spreading them apart in two directions in accordance with the way in which they are faced.

4. A process for sorting a plurality of cone shaped washers, which are indiscriminately arranged, comprising turning all of said washers in a vertical plane, and rolling them on their edges, and then spreading them apart in two directions as they are rolling, in accordance with the way in which they are faced, to form two groups, all of the washers in both groups being turned in the same direction.

5. A process of sorting a plurality of cone-shaped washers so as to cause them all to face in the same direction, comprising rolling said washers in single file and dividing the washers of the file into two groups in accordance with the direction in which they face, all of the washers in both groups being turned in the same direction.

6. A process of sorting a plurality of cone-shaped washers so as to cause them to face in the same direction, comprising bringing said washers into vertical position and rolling them in that position in single file, then dividing the file along a centrally located line so that the washers are arranged in groups on either side of the line, and turning the groups so that all of the washers will face in the same direction.

7. A process of sorting a plurality of cone-shaped washers, so as to cause them to face in the same direction comprising the steps of bringing said washers into vertical position and rolling them in that position in single file, then dividing the file along a centrally located line, directing all of the washers on one side of the line into a single group.

8. An apparatus for sorting cone-shaped washers, comprising a chute for the reception of the washers, means in the chute to turn the washers on edge, and means to divide the washers into two groups faced in opposite directions.

9. An apparatus for sorting cone-shaped washers, comprising a chute for the reception of the washers, means in the chute to turn the washers on edge and a blade to separate the washers so that they arrange themselves into two groups of washers faced in opposite directions.

10. An apparatus for sorting cone-shaped washers, comprising an inclined chute for the reception of washers, the walls of the chute being bent so as to be approximately parallel to cause the washers to lie in substantially a vertical plane, and a separating element located within the chute and adapted to divide the washers into two groups according to the direction in which they are faced and slideways to receive the washers after they pass the separating element.

11. An apparatus for sorting cone-shaped washers, comprising a chute, two runways for washers leading from the chute, means within the chute for causing the washers to pass a point in single file and in a vertical plane, and a separating device at said point to direct the washers into either of said runways in accordance with the direction in which the washers are faced.

12. An apparatus for sorting cone-shaped washers, comprising a device for causing said washers to roll by a point in single file and a separator at that point, to direct the washers in parallel paths according to the directions in which they are faced.

13. An apparatus for sorting cone-shaped washers comprising a device for causing said washers to roll by gravity by a point in single file, and a separator located at that point to direct the washers into divergent channels according to the directions in which they are faced, and means for turning the washers in said channel so that they lie in the same direction.

14. In an apparatus for the purposes set forth, an inclined trough down which washers pass, a restricted area in said trough operating to turn the washers on edge, and a separator located within the said restricted area to divide the washers into two groups according to the direction in which they are faced.

15. In an apparatus for the purposes described, an inclined trough down which washers are adapted to pass, a restricted area located between the ends of the trough operating to turn the washers on edge and a blade within the restricted area to strike the upright washers and turn them in opposite directions in accordance with the direction in which they are faced.

16. In an apparatus for the purposes described, comprising an inclined trough down which washers are adapted to pass, a restricted area located between the ends of the trough operating to turn the washers on edge and means operating upon the washers while they are on edge to turn them in opposite directions in accordance with the direction in which they are faced.

17. In a mechanism for distributing cone-shaped washers, an inclined trough for receiving and discharging a plurality of washers, said trough being adapted to turn the washers on edge prior to their discharge and means associated with the container for directing the washers into different paths, and effecting their discharge with the face of all the washers turned in the same direction.

18. In an apparatus of the class described, a washer chute having means for supporting the washers in a rolling position in single file and a device located at a central point in the file adapted to turn the washers in opposite directions so that they face in the same direction.

19. In an apparatus of the class described, a washer chute means for supporting the washers in a vertical plane in single file, an adjustably supported blade located midway between the walls of the chute and operating to spread the washers apart and separate guideways for said washers on either side of the blade.

HAROLD A. DENMIRE.